April 25, 1967 K. L. SHRIDER ET AL 3,316,477
SYNCHRONIZING CIRCUIT
Filed Nov. 26, 1962

INVENTORS.
KENNETH L. SHRIDER
ROBERT G. SCHIEMAN
BY
Woodling, Krost,
Granger and Rust
attys.

United States Patent Office 3,316,477
Patented Apr. 25, 1967

3,316,477
SYNCHRONIZING CIRCUIT
Kenneth L. Shrider, Mayfield Heights, and Robert G. Schieman, Cleveland Heights, Ohio, assignors to Reliance Electric and Engineering Company, a corporation of Ohio
Filed Nov. 26, 1962, Ser. No. 239,972
9 Claims. (Cl. 321—46)

The invention relates to synchronizing circuits for use with alternating current and more particularly to a synchronizing circuit which may be used to synchronize the initiation of charging of a capacitor with the commencement of the positive half-cycle of an alternating current source. A particular use for this synchronizing circuit is to synchronize the firing of a unijunction transistor at a predetermined time relative to the commencement of the positive half-cycle of an alternating current source.

The synchronizing circuit of the invention may be used with an alternating current source and comprises in combination an impedance and a unidirectional conducting means connected in series to be energized from the source, the unidirectional conducting means is poled to conduct current during the negative half-cycles of the source voltage, an impedance and a capacitor are connected in series with a junction therebetween and energized from voltage source means to develop a voltage across the capacitor which is positive at the junction at least during the positive half-cycles, means connecting the unidirectional conducting means effectively in parallel with the capacitor such that the forward voltage drop across the unidirectional conducting means controls the voltage developed across the capacitor to prevent the capacitor from charging during negative half-cycles, and the unidirectional conducting means being non-conductive during positive half-cycles to permit charging the capacitor at a time synchronized relative to the commencement of the positive half-cycles.

One use, but not the only use of the synchronizing circuit of the invention, is to synchronize the firing of a unijunction transistor to produce a firing pulse for a controlled rectifier, such as a semi-conductor controlled rectifier.

An object of the invention is to clamp the voltage of a capacitor to the voltage of a unidirectional conducting means which as a forward voltage drop thereacross during periods of conduction as energized from an alternating voltage.

Another object of the invention is to provide a unijunction firing circuit which is precisely controlled in phase relative to the commencement of the positive half-cycles of an alternating voltage source.

Another object of the invention is to provide a controlled rectifier circuit control led in firing by a unijunction transistor in turn controlled by the charging of a capacitor, and with this charging precisely synchronized in accordance with the zero voltage times of an alternating voltage source.

Another object of the invention is to provide a control circuit for a semi-conductor controlled rectifier wherein no pulses are supplied to the gate of the controlled rectifier when the anode thereof is negative.

Other objects and a fuller understanding of the invention may be had by referring to the following description and claims, taken in conjunction with the accompanying drawing, in which:

Figure 1:
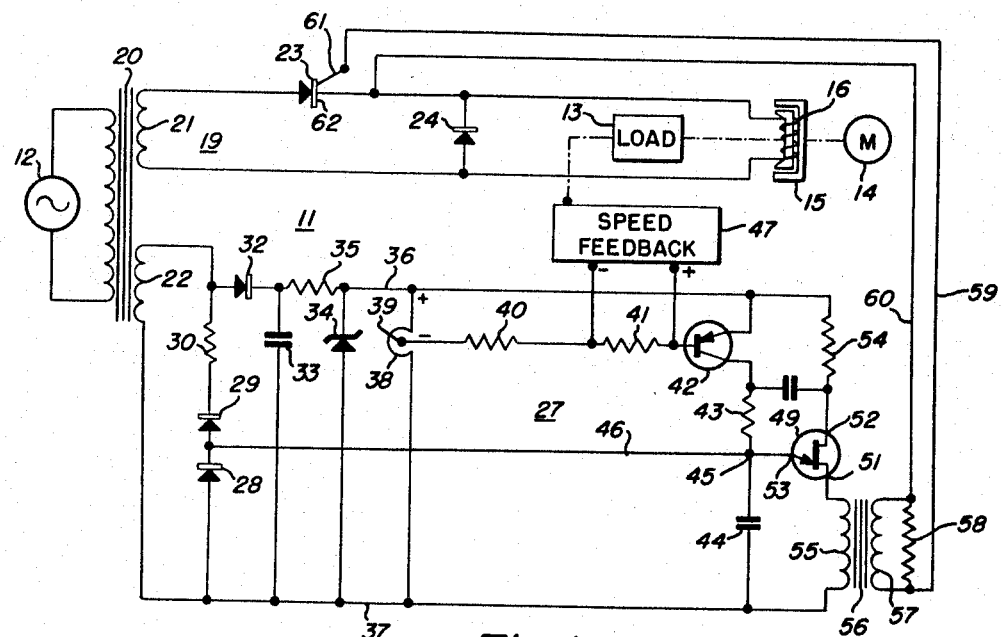
FIGURE 1 is a schematic diagram of a circuit embodying the invention.

FIGURE 1 shows schematically a circuit which may embody the present invention and shows generally a synchronizing circuit 11. This circuit 11 is operable from an alternating voltage source 12 to supply energy to some load 13. A motor 14 is shown as driving the load 13 through an eddy current clutch 15 having a field coil 16. Variable energization on the field coil 16 provides different speeds of the load 13 as driven from the motor 14.

The synchronizing circuit 11 is used with a power circuit 19 supplying rectified power to the field coil 16 from the alternating voltage source 12. A transformer 20 is energized from the voltage source 12 and has secondaries 21 and 22. A semi-conductor controlled rectifier 23 is connected in series with the load thereof, the field coil 16, and connected across the transformer secondary 21. Thus half-wave energization is supplied to the field coil 16. A back rectifier 24 is connected across the field coil 16 because of the inductive nature of the load 16.

The power circuit 19 is controlled from a control circuit 27 energized from the secondary 22. First and second diode rectifiers 28 and 29 are connected in series with a resistor 30 and connected across the secondary 22. The top end of each of the secondaries 21 and 22 are instantaneously of the same polarity. Both rectifiers 28 and 29 are poled in the same direction to conduct current on the negative half-cycles, namely, the half-cycles of the voltage source 12 wherein a negative half-cycle is applied to the anode of the controlled rectifier 23. This will be during the non-conductive half-cycles of this controlled rectifier 23. A direct current voltage source is obtained in any convenient manner and the control circuit 27 accomplishes this by a rectifier 32 and filter capacitor 33 connected across the transformer secondary 22. A Zener diode 34 and a resistor 35 establish a substantially fixed direct current voltage on conductors 36 and 37, with conductor 36 being the positive conductor. A potentiometer 38 is connected across the conductors 36 and 37 and a movable blade 39 of this potentiometer 38 picks off a direct current reference voltage. This reference voltage is applied through a resistor 40 and a resistor 41 to the base and emitter electrodes of a transistor 42. A resistor 43 and capacitor 44 are connected in series with the emitter and collector of the transistor 42. A junction 45 provides the connection between the resistor 43 and capacitor 44. A conductor 46 is connected to the junction 45 and together with the conductor 37 connects the diode rectifier 28 in parallel with the capacitor 44.

A speed feedback 47 of any convenient type, such as a tachometer generator, is driven from the load 13 and supplies a feedback signal voltage across the resistor 41.

A unijunction transistor 49 has base-one 51 and base-two 52 and an emitter 53. The bases 51 and 52 of the unijunction transistor 49 are connected in series with a current-limiting resistor 54 and the primary 55 of a pulse transformer 56. The pulse transformer 56 has a second 57 across which a load resistor 58 is connected. Conductors 59 and 60 lead from the secondary 57 to the gate 61 and cathode 62, respectively, of the controlled rectifier 23.

Operation

The power circuit 19 supplies controlled rectified energy to a load, shown in this case as the field coil 16 of an eddy current clutch 15. Depending upon the degree of energization of this field coil 16, the load 13 will be driven at high or low speeds from the motor 14.

The control circuit 27 is used to control the degree of energization of this clutch field coil 16. The control circuit 27 derives energization from the control transformer secondary 22 which has the top end thereof positive at the same time that the top end of secondary 21 is positive. This would mean that a positive half-wave is applied to the anode of the semi-conductor controlled rectifier 23 and during the opposite or negative half-cycles, the diode rectifiers 28 and 29 conduct current. Thus, during this negative half-cycle there will be a forward voltage drop across the diode rectifier 28. This may be in the order of .5 volt for usual forms of semi-conductor rectifiers. The conductors 46 and 37 connect this diode rectifier 28 in parallel with the capacitor 44, and thus the voltage across this capacitor 44 is clamped to or controlled by the voltage across the diode rectifier 28.

The capacitor 44 is charged through resistor 43 by some direct current voltage source or at least a voltage which is positive during the positive half-cycles of voltage applied to the anode of the controlled rectifier 23. The positive voltage on conductor 36 is used as this voltage source acting through the transistor 42. This transistor may be considered as an amplifier or as a variable resistance. The charge on the capacitor 44 determines the phase point of firing of the unijunction transistor 49 and this supplies a pulse through the pulse transformer 56 to the gate 61 to thus fire this controlled rectifier 23.

The unijunction transistor 49 is supplied with operating voltages from any convenient source and this has been shown as the conductors 36 and 37. Again the positive voltage applied to base-two 52 may be from any voltage source which is positive during the positive half-cycle supplied to the anode of controlled rectifier 23. The unijunction transistor 49 triggers when the voltage applied to the emitter 53 reaches a predetermined percentage of the positive voltage connected across the bases 52 and 51 thereof. When the unijunction transistor 49 triggers, a relatively large current flows through the pulse transformer primary 55 primarily from the discharge of the capacitor 44. Thus it will be seen that the pulse transformer primary 55 is connected in the emitter to base-one circuit 51 of the unijunction transistor 49.

Figure 2:
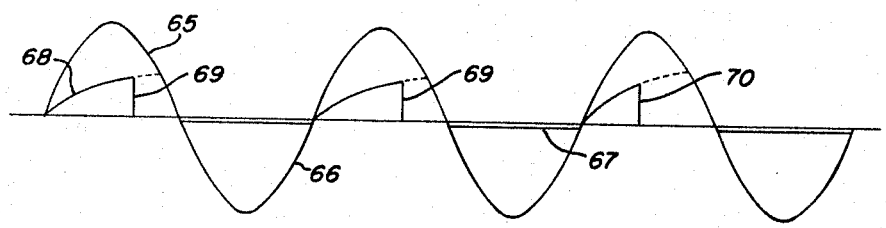
FIGURE 2 is a graph of voltage versus time.

The potentiometer 38 may be considered a speed control potentiometer. Movement of the movable blade 39 selects a predetermined reference voltage which is bucked against the speed feedback signal across resistor 41. This reference voltage is then amplified in the transistor amplifier 42 to supply a variable current through the resistor 43 to charge the capacitor 44. This charging commences at a synchronized time relative to the commencement of the positive half-cycle 65 as shown in FIGURE 2. This is accomplished because during the negative half-cycle 66 of the source voltage 12, the voltage 67 of the capacitor 44 is clamped to the voltage of the diode rectifier 28. As stated above, this is a small voltage—about .5 volt—and junction 45 will be negative relative to conductor 37. As the source voltage changes from negative to positive, the diode rectifier 28 ceases conduction and thus the capacitor 44 is free to commence charging through resistor 43 and transistor 42. Thus in accordance with the setting of the speed potentiometer 38, the capacitor 44 charges at a predetermined rate as shown in curve 68 in FIGURE 2. At a predetermined time 69, dependent upon the charge rate, the voltage at junction 45 reaches a sufficiently large positive potential to trigger the unijunction transistor 49. This sends a pulse through pulse transformer 56 to fire the semi-conductor controlled rectifier 23. If the potentiometer 38 is moved to increase the reference voltage, or if the load 13 increases to decrease the speed feedback signal, then the control circuit 27 increases the charging rate to trigger the unijunction transistor 49 at a new point 70 which is earlier in time-phase relationship to the zero point of the source voltage. When the source voltage again goes negative, the controlled rectifier 23 is extinguished and the diode rectifier 28 again conducts to again clamp the voltage of the capacitor 44. This prevents any charge on this capacitor until the next positive half-cycle. Accordingly, it will be seen that the initiation of charging of this capacitor 44 is precisely synchronized to the point in time of commencement of the positive half-cycles of the source voltage.

The synchronizing circuit of the present invention thus prevents any pulses being supplied by the firing circuit to the gate 61 of the controlled rectifier 23 during the negative half-cycles of anode voltage on controlled rectifier 23. This promotes long life to the controlled rectifier 23 because such pulses tend to overheat the semi-conductor controlled rectifier. A more important result is that the state of charge on the capacitor 44 is under a carefully controlled condition. The unijunction transistor 49 is operated essentially as a relaxation oscillator and this clamping of the voltage on the capacitor 44 synchronizes the start of the charging voltage on the capacitor 44. This results in the firing point 69 or 70 being precisely controlled in phase angle so that the controlled rectifier load 16 has a precise amount of energy supplied thereto, and also assures a smoothly controlled flow of energy to this load or field coil 16.

The pulse transformer 56 is shown as representative of one form of firing circuit for the controlled rectifier 23. The unijunction transistor 49 is a form of amplifier, in this case a semi-conductor amplifier controlled by the voltage developed across the capacitor 44. It is a low impedance device after triggering to supply the energy from the capacitor 44 to the firing circuit, in this case the pulse transformer primary 55.

The rectifier 29 prevents flow of current from the transformer secondary 22 to the capacitor 44 during the positive half-cycles.

The voltage on the transformer secondary 22 should preferably be in the order of two to three times the voltage used for charging the capacitor 44. This assures that the alternating voltage, such as the positive half-cycle 65, will rise faster, when the clamp is removed, than the charging voltage on the capacitor. If the charging voltage on the capacitor tried to rise faster than the alternating voltage source, then the voltage on the capacitor would be affected by the voltage of transformer secondary 22 and would disturb the firing point of the unijunction transistor causing improper firing of the controlled rectifier.

Although this invention has been described in its preferred form with a certain degree of particularity, it is understood that the present disclosure of the preferred form has been made only by way of example and that numerous changes in the details of the circuit and the combination and arrangement of circuit elements may be resorted to without departing from the spirit and scope of the invention as hereinafter claimed.

What is claimed is:

1. A synchronizing circuit for use with an A.C. source having positive and negative half-cycles of said source voltage, comprising in combination, an impedance and unidirectional conducting means connected in series to be energized from said source, said unidirectional conducting means poled in a direction to conduct current during the negative half-cycles of said source voltage, voltage source means, an impedance and a capacitor connected in series with a junction therebetween, means for energizing said series combination of impedance and capacitor from said voltage source means to develop a voltage across said capacitor which is positive at said junction at least during said positive half-cycles, means connecting said unidirectional conducting means effectively in parallel with said capacitor such that the forward voltage drop across said unidirectional conducting means controls the voltage developed across said capacitor to prevent said capacitor from charging during said negative half-cycles, and said unidirectional conducting means being non-conductive during said positive half-cycles to permit charging of said capacitor at a time synchronized relative to the commencement of said positive half-cycles.

2. A synchronizing circuit for a controllable unidirectional conducting device operable with an A.C. source having positive and negative half-cycles of said source voltage, comprising in combination,
   an impedance and second unidirectional conducting means connected in series to be energized from said source,
   said second unidirectional conducting means poled in a direction to conduct current during the negative half-cycles of said source voltage,
   voltage source means,
   an impedance and a capacitor connected in series with a junction therebetween,
   means for energizing said series combination of impedance and capacitor from said voltage source means to develop a voltage across said capacitor which is positive at said junction at least during said positive half-cycles,
   means connecting said second unidirectional conducting means effectively in parallel with said capacitor such that the forward voltage drop across said second unidirectional conducting means controls the voltage developed across said capacitor to prevent said capacitor from charging during said negative half-cycles,
   said second unidirectional conducting means being non-conductive during said positive half-cycles to permit charging of said capacitor at a time synchronized relative to the commencement of said positive half-cycles,
   and means dependent on the charge on said capacitor during said positive half-cycles to control said controllable unidirectional conducting device.

3. A synchronizing circuit for a controllable rectifier supplying a load from an A.C. source during positive half-cycles of said source voltage, comprising in combination,
   an impedance and unidirectional conducting means connected in series to be energized from said source,
   said unidirectional conducting means poled in a direction to conduct current during the negative half-cycles of non-conduction of said controllable rectifier,
   voltage source means,
   an impedance and a capacitor connected in series with a junction therebetween,
   means for energizing said series combination of impedance and capacitor from said voltage source means to develop a voltage across said capacitor which is positive at said junction at least during said positive half-cycles,
   means connecting said unidirectional conducting means in parallel with said capacitor such that the forward voltage drop across said unidirectional conducting means controls the voltage developed across said capacitor to prevent said capacitor from charging during said negative half-cycles,
   a semi-conductor amplifier having an input and an output,
   means connecting said junction between said impedance and capacitor to said amplifier input to supply an input voltage thereto upon the capacitor charging to a predetermined positive voltage at said junction during the positive half-cycles of the source voltage,
   and means connecting said amplifier output to said controllable rectifier to cause conduction thereof.

4. A synchronizing circuit for use with an A.C. source having positive and negative half-cycles of said source voltage, comprising in combination,
   an impedance and unidirectional conducting means connected in series to be energized from said source,
   said unidirectional conducting means poled in a direction to conduct current during the negative half-cycles of said source voltage,
   voltage source means,
   an impedance and a capacitor connected in series with a junction therebetween,
   means for energizing said series combination of impedance and capacitor from said voltage source means to develop a voltage across said capacitor which is positive at said junction at least during said positive half-cycles,
   means connecting said unidirecitonal conducting means in parallel with said capacitor such that the forward voltage drop across said unidirectional conducting means controls the voltage developed across said capacitor to prevent said capacitor from charging during said negative half-cycles,
   said unidirectional conducting means being non-conductive during said positive half-cycles to permit charging of said capacitor at a synchronized time relative to the commencement of said positive half-cycles.

5. A synchronizing circuit for use with an A.C. source having positive and negative half-cycles of said source voltage, comprising in combination,
   an impedance and unidirectional conducting means connected in series to be energized from said source,
   said unidirectional conducting means poled in a direction to conduct current during the negative half-cycles of said source voltage,
   voltage source means,
   an impedance and a capacitor connected in series with a junction therebetween,
   means for energizing said series combination of impedance and capacitor from said voltage source means to develop a voltage across said capacitor which is positive at said junction at least during said positive half-cycles,
   means connecting said unidirectional conducting means in parallel with said capacitor such that the forward voltage drop across said unidirectional conducting means controls the voltage developed across said capacitor to prevent said capacitor from charging during said negative half-cycles,
   said unidirectional conducting means being non-conductive during said positive half-cycles to permit charging of said capacitor at a synchronized time relative to the commencement of said positive half-cycles,
   a unijunction transistor having first and second bases and an emitter,
   means connecting said unijunction transistor bases to said voltage source means for operating said transistor,
   and means connecting said emitter to said junction between said impedance and capacitor to trigger said unijunction transistor into conduction upon the capacitor charging to a predetermined positive voltage at said junction during the positive half-cycles of the source voltage.

6. A synchronizing circuit for a semi-conductor controlled rectifier supplying a load with direct current from an A.C. source during positive half-cycles of said source voltage, comprising in combination,
   an impedance and unidirectional conducting means connected in series to be energized from said source,
   said unidirectional conducting means poled in a direction to conduct current during the negative half-cycles of non-conduction of said controlled rectifier,
   voltage source means,
   an impedance and a capacitor connected in series with a junction therebetween,
   means for energizing said series combination of impedance and capacitor from said voltage source means to develop a voltage across said capacitor which is positive at said junction at least during said positive half-cycles,
   means connecting said unidirectional conducting means in parallel with said capacitor such that the forward voltage drop across said unidirectional conducting means controls the voltage developed across said capacitor to prevent said capacitor from charging during said negative half-cycles,
a unijunction transistor having first and second bases and an emitter,
means connecting said unijunction transistor bases to said voltage source means for operating said transistor,
means connecting said emitter to said junction between said impedance and capacitor to trigger said unijunction transistor into conduction upon the capacitor charging to a predetermined positive voltage at said junction during the positive half-cycles of the source voltage,
and means connecting said unijunction transistor to fire said controlled rectifier upon triggering of said unijunction transistor.

7. A synchronizing circuit for a semi-conductor controlled rectifier supplying a load with direct current from an A.C. source during positive half-cycles of said source voltage, comprising in combination,
a load impedance and unidirectional conducting means connected in series to be energized from said source,
said unidirectional conducting means poled in a direction to conduct current during the negative half-cycles of non-conduction of said controlled rectifier,
D.C. voltage source means,
an impedance and a capacitor connected in series across said D.C. voltage source means,
means connecting said unidirectional conducting means in parallel with said capacitor such that said capacitor is clamped to the forward voltage drop across said unidirectional conducting means to prevent said capacitor from charging during said negative half-cycles,
a firing circuit connected to fire said controlled rectifier,
a unijunction transistor having first and second bases and an emitter,
means connecting said unijunction transistor bases and said firing circuit in series across said D.C. voltage source means,
said emitter being connected to the junction between said impedance and capacitor to trigger said unijunction transistor into conduction upon the capacitor charging to a predetermined voltage level from said D.C. voltage source means,
the triggering of said unijunction transistor delivering a pulse to fire said controlled rectifier during the positive half-cycles of the source voltage.

8. A synchronizing circuit for a semi-conductor controlled rectifier supplying a load with direct current from an A.C. source during positive half-cycles of said source voltage, comprising in combination,
a load impedance and a diode rectifier connected in series to be energized from said source,
said diode rectifier poled in a direction to conduct current during the negative half-cycles of non-conduction of said controlled rectifier.
D.C. voltage source means,
an impedance and a capacitor connected in series across said D.C. voltage source means,
means connecting said diode rectifier in parallel with said capacitor such that said capacitor is clamped to the forward voltage drop across said diode rectifier to prevent said capacitor from charging during said negative half-cycles,
a firing circuit connected to fire said controlled rectifier,
a unijunction transistor having first and second bases and an emitter,
means connecting said unijunction transistor bases and said firing circuit in series across said D.C. voltage source means,
said emitter being connected to the junction between said impedance and capacitor to trigger said unijunction transistor into conduction upon the capacitor charging to a predetermined voltage level from said D.C. voltage source means,
the triggering of said unijunction transistor delivering a pulse to fire said controlled rectifier during the positive half-cycles of the source voltage.

9. A synchronizing circuit for a semi-conductor controlled rectifier supplying a load with direct current from an A.C. source during positive half-cycles of said source voltage, comprising in combination,
a constant potential D.C. voltage source means,
an impedance and a capacitor connected in series across a load resistor and first and second diode rectifiers connected in series to be energized from said source,
said diode rectifiers poled in the same direction to conduct current during the negative half-cycles of non-said D.C. voltage source means,
means connecting said first diode rectifier in parallel with said capacitor such that said capacitor is rectifier to prevent said capacitor from charging clamped to the forward voltage drop across said first during said negative half-cycles,
a pulse transformer having a secondary connected to fire said controlled rectifier,
a primary on said pulse transformer,
a unijunction transistor having first and second bases and an emitter.
means connecting said unijunction transistor bases and said pulse transformer primary in series across said constant potential D.C. voltage source means,
said emitter being connected to the junction between said impedance and capacitor to trigger said unijunction transistor into conduction upon the capacitor conduction of said controlled rectifier,
charging to a predetermined voltage level from said D.C. voltage source means,
the triggering of said unijunction transistor causing a pulse to be delivered from said pulse transformer to fire said controlled rectifier at a controlled phase angle during the positive half-cycles of the source voltage.

References Cited by the Examiner

UNITED STATES PATENTS 2,942,169 6/1960 Kalfaian _____ 320—1
3,146,392 8/1964 Sylvan.
3,213,351 10/1965 Walker _____ 321—47 X

OTHER REFERENCES

General Electric Publication, "Notes on the Application of the Silicon Controlled Rectifier," December 1958, pp. 41–45.

JOHN F. COUCH, *Primary Examiner.*

W. M. SHOOP, *Assistant Examiner.*